3,080,424
PROCESS FOR PREPARATION OF PRIMARY AND SECONDARY AMINES

Bernard H. Gwynn, Tarentum, and Arthur C. Whitaker, Woodland Farms, Pa., assignors to Gulf Research & Development Company, Pittsburgh, Pa., a corporation of Delaware
No Drawing. Filed Oct. 9, 1959, Ser. No. 845,322
8 Claims. (Cl. 260—585)

This invention relates to a method of preparing amines, more particularly to a method of preparing primary and secondary amines by the reaction of ammonia or a primary amine with aluminum alkoxides.

We have found that primary and secondary amines can be prepared in good yields by reacting ammonia or a primary amine with an aluminum alkoxide compound under carefully controlled conditions. By operating in accordance with the present invention control of the reaction can be easily effected, the yield of product increased and the product distribution between primary and secondary amines can be controlled. The aluminum alkoxide compounds employed herein can be prepared, for example, by the reaction of the appropriate alcohol, such as ethylhexanol, or thiol, such as 1-propanethiol, with an organic aluminum compound, for example, an aluminum alkyl, such as triisobutyl aluminum, in the presence of a suitable solvent, such as benzene, followed by distillation to recover the product.

The aluminum alkoxide used in this process for reaction with ammonia or primary amine will depend on the amine product desired. The aluminum alkoxide which can be utilized in this process can be represented by the general formula $(RA)_xAlY_z$, wherein R is an alkyl group having from 6 to 16 carbon atoms, such as, for example, hexyl, octyl, decyl, undecyl and hexadecyl; A is oxygen; $x$ is an integer from one to three; Y is hydrogen; an alkyl group having from one to 12 carbon atoms, for example, ethyl, butyl, octyl, dodecyl; an aralkyl group having from 7 to 13 carbon atoms, such as, for example, benzyl, β-phenethyl, diphenylmethyl, phenylisopropyl; an alkaryl group having from 7 to 16 carbon atoms, such as, for example, di-butylphenyl, decylphenyl, tolyl, xylyl, cumyl; and $z$ equals three minus $x$.

The choice of aminating agent employed in the reaction with the aluminum alkoxide will control the product distribution in the reaction. Ammonia will yield both primary amines and secondary amines. Since ammonia is the only aminating agent which we know can be reacted to form a primary amine, it is employed in the reaction with the appropriate aluminum alkoxide in cases wherein a primary amine is desired. Primary amines of the general formula $RNH_2$, wherein R is as defined above, can also be reacted with the aluminum alkoxides. In such case secondary amines are obtained.

The ratio of reactants is not critical and the reaction will go even if small amounts of either reactant is present. However, in order to obtain high yields of amine product the molar ratio of the reactant ammonia or primary amine to the aluminum alkoxide should be such that the ammonia or primary amine is present in molar excess. In general, at least about one mole of reactant ammonia or primary amine, preferably about two to about ten moles of ammonia or primary amine, per mole of aluminum alkoxide reactant produces excellent results.

The reaction is preferably carried out at elevated temperatures with the upper limit of the temperature which can be employed being determined by the thermal stability of the reactants and the products obtained in the system. Thus, the reaction temperature can be from about 200° to about 350° C. In general, however, best results are obtained at a temperature of about 275° to about 325° C.

In carrying out the process of this invention to obtain a high conversion to a product containing satisfactory amounts of primary and secondary amines, it is absolutely essential that the reaction be carried out at elevated pressures. The lowest optimum pressure is about 300 pounds per square inch gauge, but the upper limit is not critical since an increase in pressure will increase the yield of amine only slightly. Thus, a pressure of about 300 to about 5000 pounds per square inch gauge, preferably about 900 to about 2000 pounds per square inch gauge, can be employed.

The time necessary to obtain a satisfactory reaction between the aluminum alkoxide and ammonia or primary amine is not critical, although a comparatively long time is required to obtain good conversion. In general, a reaction time of about 45 minutes to about three hours is required. The preferred time is about one to about two hours.

The reaction will go satisfactorily in the absence of a catalyst and therefore a catalyst is not necessary to obtain satisfactory yields of the amine products. We have found, however, that the addition of a small amount of a selected catalyst aids in increasing the over-all yield of primary and secondary amines and in promoting the formation of secondary amines over primary amines. Not all catalysts can be employed. We have found that Friedel-Crafts catalysts, such as aluminum chloride, boron trifluoride, zirconium tetrachloride, aluminum bromide, etc., are critical in the process of this invention in order to control product distribution. Of these, aluminum chloride is preferred. Catalysts, such as aluminum oxide, sodium methylate, mercuric iodide-iodine complexes are not preferred since they either have a neutral effect on the reaction or are actually detrimental. The concentration of the catalyst, when employed, is critical and must be in the molar ratio of catalyst to aluminum alkoxide of less than about one, preferably in the range of about two-tenths to about six-tenths.

We have also found that the addition of a suitable solvent to the reaction mixture has a pronounced effect on the distribution of primary amine and secondary amine in the product. The solvent employed must be substantially inert with respect to the reactants employed and products obtained and cannot be a halogenated hydrocarbon, since these compounds have a negative effect on the reaction. Examples of suitable solvents are the hydrocarbon solvents, i.e., benzene, hexane, heptane, toluene, xylene, etc. Solvents which are detrimental include chlorobenzene, iodobenzene, chloroform, etc. The use of the appropriate solvent has a tendency to shift the product distribution toward a primary amine. The amount of solvent can vary from about one-half to about four times the volume of aluminum alkoxide compound, with the preferred volume of solvent equal to about one to two times the volume of the aluminum alkoxide.

The hydroxide formed as a byproduct of the reaction of ammonia or primary amine with the aluminum alkoxide in accordance with the present process does not interfere with the reaction and therefore need not be removed from the reaction zone. While the reaction can be carried out in some cases with each of the reactants in the vapor phase, this is not preferred since the temperature in many cases would be above the boiling point of one or more of the reactants and would thus result in a low yield of amine products. A higher conversion is obtained by carrying out the reaction with the reactants in the mixed phase, that is, with the aluminum alkoxide in the liquid phase and ammonia or primary amine in the vapor phase, but preferably with each of the reactants in the liquid phase.

The invention can be further illustrated by reference to the following examples:

Example 1 below shows that the process of this invention can be carried out in the absence of a solvent and catalyst.

*Example 1*

A charge stock of aluminum tri-2-ethylhexoxide was prepared by slowly adding 583 grams (4.47 moles) of 2-ethylhexanol to 327 grams (1.65 moles) of tri-isobutyl aluminum, using 495 milliliters of benzene as a solvent. When the reaction was complete the material was distilled at 85° C. to remove the dissolved isobutane. The product or stock solution contained 57 weight percent aluminum tri-2-ethylhexoxide. A portion, 66.7 grams of the stock solution, was added to a one-liter rocking autoclave. The benzene was removed under vacuum and 38 grams of aluminum tri-2-ethylhexoxide were recovered.

A charge of 45 grams (2.64 moles) of ammonia was added in the vapor phase to 38 grams (0.092 mole) of aluminum tri-2-ethylhexoxide and the temperature increased to 300° C. over a period of one hour and 45 minutes. The temperature was maintained at about 300° C. for an additional period of one hour. The maximum pressure reached during the run was 1075 pounds per square inch gauge. After the run was complete the autoclave was cooled with air and the contents were washed out with benzene. The product was distilled at atmospheric and reduced pressures to separate the primary and secondary amines. The percentage of primary and secondary amine in each fraction was calculated from the theoretical yield of 2-ethylhexyl amine and the actual yield obtained by titration. A total yield of 32 mole percent was recovered, of which 15 mole percent was primary amine and 17 mole percent secondary amine.

It is apparent from the data presented above that satisfactory yields of the amine product can be prepared when the reaction is run in accordance with our process, even without a solvent and in the absence of a catalyst.

Example 2 below shows the effect of a suitable solvent on the product distribution and the yield of amine.

*Example 2*

A portion, 66.4 grams of the stock solution set out in Example 1, containing 26.6 grams of benzene, was added to a one-liter rocking autoclave together with 27 grams (1.58 moles) of ammonia. The bomb was closed and heated to 300° C. over a period of about one hour. This temperature was maintained for an additional one and one-fourth hours and the autoclave was cooled. A maximum pressure of 1000 pounds per square inch gauge was reached during the reaction. The products were removed and distilled to separate the amines. A total yield of 30 mole percent was recovered, of which 19 mole percent was primary amine and 11 mole percent secondary amine.

It will be observed from Example 2 that the use of a suitable solvent, namely benzene, resulted in an unexpected product distribution shift toward a predominance of primary over secondary amine.

Example 3 below shows the cumulative effect of an increase in pressure and concentration of ammonia on the yield and product distribution.

*Example 3*

A portion, 66.4 grams of the stock solution set out in Example 1, containing 26.6 grams of benzene, was added to a 500-milliliter rocking autoclave together with 74 grams (4.33 moles) of ammonia in the vapor phase. The temperature was increased to about 300° C. over a period of one and one-half hours and heating continued at this temperature for an additional two-hour period. The pressure in this run was 3500 pounds per square inch gauge. When the run was complete the product was removed and the autoclave washed with benzene. The product was distilled to separate the primary and secondary amines. The over-all yield was 33 mole percent, 23 mole percent of which was primary amine and 10 mole percent secondary amine.

If the results obtained in Eaxample 3 are compared with those obtained in Example 2, it will be seen that an increase in pressure and concentration of ammonia results in an appreciable increase in yield and the ratio of primary to secondary amine remains high.

Example 4 below illustrates the effect of a suitable Friedel-Crafts catalyst on the yield and product distribution.

*Example 4*

A portion, 66.8 grams of the stock solution set out in Example 1, containing 26.7 grams of benzene, was added to a one-liter rocking autoclave together with 37 grams (2.16 moles) of ammonia and ten grams (0.075 mole) of anhydrous sublimed aluminum chloride. The autoclave was heated to 300° C. over a period of approximately one hour and maintained at that temperature for an additional two hours. The maximum total pressure during this run was 1000 pounds per square inch gauge. After the run was complete the autoclave was cooled and the products removed. The over-all yield of amine was 36 mole per cent, 16 mole percent of which was primary amine and 20 mole percent secondary amine.

These data illustrate the effect obtained as a result of the use of a suitable catalyst in our reaction. Note that as a result of the use of aluminum chloride in the reaction the product distribution is shifted so that the secondary amine predominates over the primary amine.

Example 5 below shows the improved results obtained by using the catalyst in the preferred range.

*Example 5*

A portion, 135 grams of the stock solution set out in Example 1, containing 54 grams of benzene, 35 grams (2.05 moles) of ammonia in the vapor phase and 10 grams (0.075 mole) of anhydrous sublimed aluminum chloride were added to a one-liter rocking autoclave. The temperature was increased to 300° C. over a period of one and one-half hours and this temperature was maintained for an additional hour. During the heating period the ammonia was released twice to keep the total maximum pressure to approximately 1000 pounds per square inch gauge. At the completion of the run the autoclave was cooled, the contents were washed out with benzene and distilled to separate the primary from the secondary amines. A total yield of 44 mole percent was recovered, of which 16 mole percent was primary amine and 28 mole percent secondary amine.

The data presented above illustrate the improvement which results from the use of carefully selected amounts of catalysts. An improved yield of amines resulted even though the aluminum alkoxide-ammonia ration was decreased, thus showing the catalytic effect of the proper concentration of aluminum chloride.

Example 6 below shows that the presence of aluminum oxide has no appreciable effect on the yield of amines obtained nor on the distribution thereof.

*Example 6*

The product of the reaction between 138 grams (1.06 moles) of isooctyl alcohol and excess triisobutyl aluminum containing 150 milliliters of benzene, 68 grams (4.0 moles) of ammonia in the vapor phase and 50 grams (0.49 mole) of aluminum oxide, were added to a one-liter rocking autoclave. The temperature was increased to 300° C. and this temperature was maintained for a period of two hours. The maximum total pressure during this run was 1000 pounds per square inch gauge. At the completion of the run the autoclave was cooled and the contents were washed out with benzene and distilled to separate the primary from the secondary amines. A total yield of 30 mole percent was recovered of which 16 mole percent was primary amine and 14 mole percent secondary amine.

The data presented above show that aluminum oxide is not an effective catalyst for the reaction, since the yield and product distribution closely parallels the yield and product distribution obtained when the reaction was run without a solvent and in the absence of a catalyst.

Examples 7 and 8 below show that sodium methylate and the mercuric iodide-iodine complex, respectively, are not satisfactory catalysts for the reaction.

*Example 7*

A portion, 66.7 grams of the stock solution set out in Example 1, containing 27 grams of benzene, was added to a one-liter rocking autoclave together with 37 grams (2.2 moles) of ammonia and 10 grams (0.185 mole) of sodium methylate. The autoclave was heated to 300° C. over a period of one hour and maintained at that temperature for two hours. The maximum total pressure during the run was 1115 pounds per square inch gauge. After the run was complete the autoclave was cooled and the products removed. There was no evidence of any reaction having taken place between the tri-2-ethylhexoxy aluminum and ammonia.

*Example 8*

A portion, 66.4 grams of the stock solution set out in Example 1, containing 27 grams of benzene, was added to a one-liter rocking autoclave together with 50 grams (2.94 moles) of ammonia and the complex prepared from five grams of mercuric chloride, five grams of potassium iodide and one gram of iodine as a catalyst. The autoclave was heated to 300° C. over a period of one hour and maintained at that temperature for an additional two hours. The maximum total pressure during this run was 1100 pounds per square inch gauge. After the run was complete the autoclave was cooled and the product removed. The over-all yield of amine was only five percent and no secondary amine was recovered from the reaction.

The data presented in these examples illustrate that the mercuric iodide-iodine complex and sodium methylate are not satisfactory catalysts for the reaction and in fact have a negative effect on the reaction.

Example 9 below shows the adverse effect of a chlorinated hydrocarbon, such as chloroform, on the yield and product distribution in the reaction.

*Example 9*

A portion, 66.5 grams of the stock solution set out in Example 1, containing 27 grams of benzene, was added to a one-liter rocking autoclave after removal of the benzene under vacuum, along with 45 grams of chloroform, 20 grams (1.18 moles) of ammonia in the vapor phase and ten grams (0.098 mole) of aluminum oxide. The temperature was increased to 300° C. over a period of one hour and this temperature maintained for an additional two hours. The maximum total pressure during this run was 1000 pounds per square inch gauge. After the run was complete the autoclave was cooled and the contents were removed and distilled to separate any product formed. There was no evidence of any reaction between the tri-2-ethylhexoxy aluminum and ammonia.

Example 10 below also shows the adverse effect of substituting a chlorinated hydrocarbon as a solvent in the reaction.

*Example 10*

A portion, 66.6 grams of the stock solution set out in Example 1, containing 27 grams of benzene, was added to a one-liter rocking autoclave, after removal of the benzene under vacuum; 38 grams of chlorobenzene, 29 grams (1.7 moles) of ammonia in the vapor phase and ten grams (0.075 mole) of anhydrous sublimed aluminum chloride were added to the autoclave. The temperature was increased to 350° C. over a period of one hour and this temperature was maintained for an additional one and one-half hours. The maximum total pressure during this run was 1000 pounds per square inch gauge. At the completion of the run the autoclave was cooled, the contents removed and distilled to separate the primary from the secondary amines. A total yield of only 21 mole percent was recovered of which 10 mole percent was primary amine and 11 mole percent secondary amine.

A comparison of Examples 9 and 10 with Example 5 shows that the use of a chlorinated hydrocarbon as solvent has a negative effect on the overall yield of the product.

Obviously many modifications and variations of the invention as hereinbefore set forth can be made without departing from the spirit and scope thereof and, therefore, only such limitations should be imposed as are indicated in the appended claims.

We claim:

1. A process which comprises reacting one mol of an aluminum alkoxide having alkyl groups having from six to sixteen carbon atoms with at least about one mol of ammonia at a temperature of about 200° to about 350° C. and a pressure of about 300 to about 5000 pounds per square inch gauge in the presence of about one-half to about four times the volume of said aluminum alkoxide of a hydrocarbon solvent for about 45 minutes to about three hours to obtain a product comprising primary and secondary amines, the alkyl substituent on said amines corresponding to the alkyl substituent on said aluminum alkoxide.

2. A process which comprises reacting one mol of an aluminum alkoxide having alkyl groups having from six to sixteen carbon atoms with at least about one mol of ammonia at a temperature of about 200° to about 350° C. and a pressure of about 300 to about 5000 pounds per square inch gauge in the presence of from about one-half to about four times the volume of said aluminum alkoxide of benzene for about 45 minutes to about three hours to obtain a product comprising primary and secondary amines, the alkyl substituent on said amines corresponding to the alkyl substituent on said aluminum alkoxide.

3. A process which comprises reacting one mol of an aluminum alkoxide having alkyl groups having from six to sixteen carbon atoms with at least about one mol of ammonia at a temperature of about 200° to about 350° C. and a pressure of about 300 to about 5000 pounds per square inch gauge in the presence of from about one-half to about four times the volume of said aluminum alkoxide of benzene and a Friedel-Crafts catalyst, the molar ratio of said catalyst to said aluminum alkoxide being less than about one, for about 45 minutes to about three hours to obtain a product comprising primary and secondary amines, the alkyl substituent on said amines corresponding to the alkyl substituent on said aluminum alkoxide.

4. A process which comprises reacting one mol of an aluminum alkoxide having alkyl groups having from six to sixteen carbon atoms with at least about one mol of ammonia at a temperature of about 200° to about 350° C. and a pressure of about 300 to about 5000 pounds per square inch gauge in the presence of from about one-half to about four times the volume of said aluminum alkoxide of benzene and aluminum chloride, the molar ratio of said catalyst to said aluminum alkoxide being less than about one, for about 45 minutes to about three hours to obtain a product comprising primary and secondary amines, the alkyl substituent on said amines corresponding to the alkyl substituent on said aluminum alkoxide.

5. A process which comprises reacting one mol of aluminum tri-2-ethylhexoxide with at least about one mol of ammonia at a temperature of about 200° to about 350° C. and a pressure of about 300 to about 5000 pounds per square inch gauge in the presence of about one-half to about four times the volume of said aluminum alkoxide of a hydrocarbon solvent for about 45 minutes to about three hours to obtain a product comprising primary and secondary amines, the alkyl substituent on said amines corresponding to the alkyl substituent on said aluminum alkoxide.

6. A process which comprises reacting one mol of aluminum tri-2-ethylhexoxide with at least about one mol of ammonia at a temperature of about 200° to about 350° C. and a pressure of about 300 to about 5000 pounds per square inch gauge in the presence of from about one-half to about four times the volume of said aluminum alkoxide of benzene for about 45 minutes to about three hours to obtain a product comprising primary and secondary amines, the alkyl substituent on said amines corresponding to the alkyl substituent on said aluminum alkoxide.

7. A process which comprises reacting one mol of aluminum tri-2-ethylhexoxide with at least about one mol of ammonia at a temperature of about 200° to about 350° C. and a pressure of about 300 to about 5000 pounds per square inch gauge in the presence of from about one-half to about four times the volume of said aluminum alkoxide of benzene and a Friedel-Crafts catalyst, the molar ratio of said catalyst to said aluminum alkoxide being less than about one, for about 45 minutes to about three hours to obtain a product comprising primary and secondary amines, the alkyl substituent on said amines corresponding to the alkyl substituent on said aluminum alkoxide.

8. A process which comprises reacting one mol of aluminum tri-2-ethylhexoxide with at least about one mol of ammonia at a temperature of about 200° to about 350° C. and a pressure of about 300 to about 5000 pounds per square inch gauge in the presence of from about one-half to about four times the volume of said aluminum alkoxide of benzene and aluminum chloride, the molar ratio of said catalyst to said aluminum alkoxide being less than about one, for about 45 minutes to about three hours to obtain a product comprising primary and secondary amines, the alkyl substituent on said amines corresponding to the alkyl substituent on said aluminum alkoxide.

References Cited in the file of this patent

Lazier et al.: J. Am. Soc., vol. 46, pp. 741–6 (1924).
Strain: J. Am. Soc., vol. 52, pp. 820–3 (1930).